March 31, 1942.     K. KELLER     2,278,201
DYNAMOMETER
Filed May 24, 1939
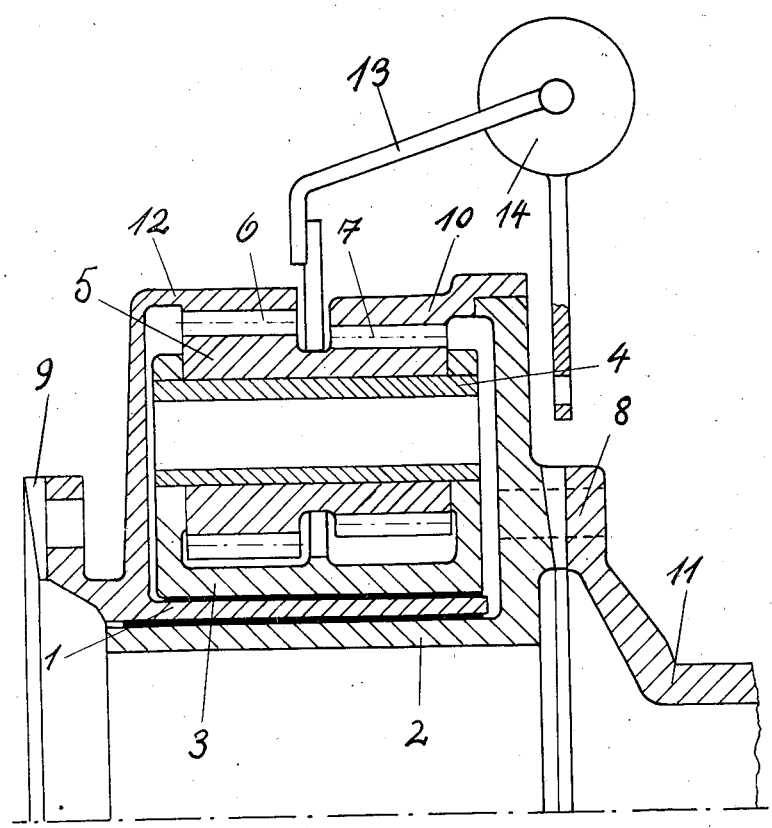
Konradin Keller
Inventor Patented Mar. 31, 1942

2,278,201

UNITED STATES PATENT OFFICE 2,278,201

DYNAMOMETER

Konradin Keller, Munich-Lochham, Germany, assignor to Bayerische Motoren Werke Aktiengesellschaft, Munich, Germany, a company of Germany Application May 24, 1939, Serial No. 275,360
In Germany May 24, 1938

7 Claims. (Cl. 265—25)

This invention relates to improvements in dynamometers and particularly such devices especially adapted for aircraft engines.

An object of the invention is to provide a dynamometer so constructed that it may serve as an adapter or intermediate device between the driving hub of an airplane power plant and the propeller.

Another object is to provide a dynamometer so constructed that the forces generated thereby and to be measured in determining the torque are kept as low as possible so that the forces may be measured by relatively light and small means.

Another object is to provide a dynamometer of the planetary type comprising a driving gear, a driven gear, and intermediate planetary gear means, the parts being so constructed and arranged that the torque applied to the intermediate or planetary gear is a measure of the torque transmitted from the driving gear to the driven gear.

Another object is to provide such a device in which the rotation speed of the driven gear is only slightly greater or less than that of the driving gear so that the resulting forces, which are a measure of the torque transmitted, may be kept as low as possible.

Further objects and advantages of this invention will be apparent from consideration of the specification as illustrated by the accompanying drawing of possible embodiments of the invention which shows in half section a dynamometer illustrating the invention as attached to the driving flange of a power plant and provided with means for carrying a propeller or other driven device.

Referring to said drawing, the numeral 3 indicates a planetary gear carrier in the form of a drum mounted for free rotation on the hub 1 and which drum carries, for example, three bearing pins 4 uniformly distributed over the periphery of the drum, on each of which pins there is mounted for rotation a gear cluster 5 consisting of two gears 6 and 7 of a slightly different pitch diameter. The drum 3 therefore provides a planetary carrier for the planetary gears 5.

According to the form of device selected to illustrate the invention, the dynamometer is firmly connected to the flange 8, preferably the usual supporting and driving flange for the propeller, connected for rotation with the member 11 which may be the crank shaft of the engine or other power delivery shaft of the power plant.

The dynamometer body includes an extension sleeve 2 which serves as a bearing for the sleeve 1 which carries the propeller flange 9 to which the propeller (not shown) is to be attached. Connected with the member 2 and carried for rotation thereby is the internal gear 10 in constant mesh with the pinion 7 of the gear cluster 5. The other gear 6 thereof is in constant mesh with the internal gear 12 connected for rotation with the member 1 and the propeller. It is to be noted that the pitch diameters of gears 10 and 12 are slightly different, preferably by the same amount as the variation of the pitch diameters of gears 6 and 7.

This has the advantage (1) that the speed ratio is diminished only very slightly by the dynamometer so that the test results are comparable with flying conditions without the dynamometer, and (2) that the torque applied to the planetary carrier is very small and therefore smaller and lighter torque indicating mechanism can be employed, a feature of great importance in airplanes.

The output of the power plant is measured by determining the torquqe acting upon the planetary carrier 3 due to the differential action resulting from the ratio of the gears 6 and 12 and 7 and 10, respectively. For this purpose, the rotatably mounted drum 3 which carries the bearing pins 4 for the gear cluster 5 is connected as by an arm 13 to any suitable force measuring device, such as a hydraulic measuring device 14 which has been chosen for the purpose of illustrating the invention.

With use of such a device, the oil pressure developed in the member 14 by the force exerted thereon by the arm 13 caused by the torque differential acting upon gear cluster 5 serves for determining the output. The torque acting at any time upon the drum 3 and transmitted by the arm 13 to the hydraulic measuring device can be read off from a suitably calibrated pressure gauge connected thereto and as the torque difference bears a predetermined relation to the torque transmitted by the crank shaft (depending upon the reduction or step-up ratio of the dynamometer gearing), the torque delivered by the power plant can also be indicated directly by appropriate graduations on the pressure gauge. Knowing the engine speed, it is then possible to determine the engine output from the known data. In that connection, it is pointed out that for one or more constant engine speeds the pressure gauge may be graduated to indicate the output directly in horse power. When calculating the power plant torque it is only necessary to consider the efficiency of the dynamometer gearing.

An advantage of the present invention resides therein that the dynamometer can be readily connected for testing any suitable engine as the only change required is that the propeller is moved forwardly by the distance corresponding to the length of the dynamometer. The hydraulic measuring device is in that case preferably secured to the engine casing or other suitable support and as in accordance with the invention the measuring device is subjected to only small forces, this can readily be done. Therefore, no reconstruction of the power plant is necessary and the determination of the power plant output, which is very important in connection with practical flying operation, can be readily effected either on the ground or at any desired altitude and under actual conditions of operation in a manner which is simple and certain in operation.

Various modifications are contemplated. Thus, it is not necessary that the gears 10 and 12 be internal gears. If externally toothed gears are employed, such as spur, helical, or herringbone gears, the gear cluster 5 would of course lie outside of gears 10 and 12. This would probably enlarge the diameter which would be objectionable in aircraft use but which might not be objectionable in other contemplated uses.

It is to be understood, therefore, that the construction disclosed above is intended merely as illustrative of the invention and not as limiting as various modifications therein may be made without departing from the invention as defined by a proper interpretation of the claims which follow:

1. In a dynamometer especially adapted for measuring the torque of aircraft engines during flight, the combination of a gear driven by the engine, a second gear of a slightly different effective diameter connected for driving the propeller, planetary gearing means intermediate said gears, a drum supported co-axially upon the first-mentioned gear carrying said planetary gearing means, and means connected with said drum for measuring the torque applied to said drum.

2. In a dynamometer especially adapted for measuring the torque of aircraft engines during flight, the combination of a gear driven by the engine, a second gear of a slightly different effective diameter connected for driving the propeller and co-axially supported upon the first-mentioned gear, planetary gearing means intermediate said gears, a planetary carrier upon which said planetary gearing means are mounted, supported co-axially upon said second gear, and means connected with said planetary carrier for measuring the torque applied to said planetary carrier.

3. In a dynamometer especially adapted for measuring the torque of aircraft engines during flight, the combination of a gear driven by the engine, a second gear of a slightly different effective diameter connected for driving the propeller, both of said gears being internal gears, planetary gearing means in the form of spur gears meshing with said internal gears, a planetary carrier upon which said planetary gearing means are mounted, and means connected with said planetary carrier for measuring the torque applied to said planetary carrier.

4. In an aeroplane of the class wherein the propeller is adapted to be connected to the end of the power delivery shaft of the aeroplane engine, the combination of removable interposed means for measuring engine torque during flight comprising a first gear, means for interconnecting said gear to said power delivery shaft in place of the propeller, a second gear of only slightly different diameter than said first gear, having a shaft extension co-axial with said power delivery shaft for driving the propeller and formed substantially identical with said end of said power delivery shaft, planetary gearing means interconnecting said first and second gears, a planetary carrier supporting said planetary gearing means, and means connected with said planetary carrier for measuring the torque applied to said planetary carrier.

5. In an aeroplane of the class wherein the propeller is adapted to be connected on the end of the power delivery shaft of the aeroplane engine, the combination of removable interposed means for measuring engine torque during flight, comprising a first member having a stub shaft extension and a first gear radially spaced from said stub shaft extension, means for mounting said member on the end of said power delivery shaft in place of the propeller in such a manner that said stub shaft and first gear will be substantially co-axial with said power delivery shaft, a second member having one end for driving the propeller formed substantially identical to the end of the power delivery shaft and on its other end having a cylindrical extension journaled upon said stub shaft, and a second gear substantially co-axial with said cylindrical extension, planetary gearing means interconnecting said first and second gears, a planetary carrier supporting said planetary gearing means, and means connected with said planetary carrier for measuring the torque applied to said planetary carrier.

6. The combination according to claim 5, in which said planetary carrier comprises a drum journaled upon said cylindrical extension.

7. The combination according to claim 5, in which said first and second gears are each annular gears.

KONRADIN KELLER.